United States Patent
Dasgupta et al.

(10) Patent No.: US 7,033,702 B2
(45) Date of Patent: Apr. 25, 2006

(54) PARTICULATE ELECTRODE INCLUDING ELECTROLYTE FOR A RECHARGEABLE LITHIUM BATTERY

(75) Inventors: Sankar Dasgupta, Mississauga (CA); James K. Jacobs, Toronto (CA); Rakesh Bhola, Mississauga (CA)

(73) Assignee: Electrovaya Inc., Mississauga (CA)

( * ) Notice: Subject to any disclaimer, the term of this patent is extended or adjusted under 35 U.S.C. 154(b) by 0 days.

(21) Appl. No.: 10/933,243

(22) Filed: Sep. 3, 2004

(65) Prior Publication Data
US 2005/0034300 A1    Feb. 17, 2005

Related U.S. Application Data

(63) Continuation of application No. 09/906,091, filed on Jul. 17, 2001, now Pat. No. 6,815,121.

(60) Provisional application No. 60/221,955, filed on Jul. 31, 2000.

(51) Int. Cl.
*H01M 4/80* (2006.01)

(52) U.S. Cl. .................... 429/235; 429/236; 429/232; 429/241; 429/212; 429/217; 429/231.95; 429/231.1; 429/231.4; 429/142; 29/623.1; 29/623.5

(58) Field of Classification Search ............... 29/623.1, 29/623.5; 429/212, 217, 231.95, 231.1, 232, 429/235, 236, 241, 231.4, 129, 142
See application file for complete search history.

(56) References Cited

U.S. PATENT DOCUMENTS

| | | | |
|---|---|---|---|
| 4,320,184 A | * | 3/1982 | Bernstein et al. .......... 29/623.1 |
| 4,320,185 A | * | 3/1982 | Bernstein et al. .......... 29/623.1 |
| 4,925,752 A | | 5/1990 | Fauteux et al. |
| 5,436,091 A | | 7/1995 | Shackle et al. |
| 5,438,249 A | | 8/1995 | Chang et al. |
| 5,571,634 A | | 11/1996 | Gozdz et al. |
| 5,665,265 A | | 9/1997 | Gies et al. |
| 5,681,357 A | | 10/1997 | Eschbach et al. |
| 5,756,230 A | | 5/1998 | Gao et al. |
| 5,834,107 A | | 11/1998 | Wang et al. |

FOREIGN PATENT DOCUMENTS

| | | |
|---|---|---|
| EP | A-0460617 | 12/1991 |
| GB | A-2181884 | 4/1987 |
| JP | 59-148279 | * 8/1984 |
| JP | 04-363866 P | 12/1992 |
| JP | 04363866 | 12/1992 |
| JP | 08124558 | 5/1996 |

(Continued)

*Primary Examiner*—Laura Weiner

(57) ABSTRACT

A matted particulate electrode located between the current collector and a porous separator of a rechargeable lithium battery is described, which contains electro-active particles intermixed with pliable, solid, lithium ion conducting, polymer electrolyte filaments having adhesive surfaces. The electro-active particles and the optionally added electro-conductive carbon particles adhere to the tacky surface of the adhesively interlinking polymer electrolyte filaments. The matted particulate electrode is impregnated with an organic solution containing another lithium compound. In a second embodiment the porous separator is coated on at least one of its faces, with polymer electrolyte having an adhesive surface and made of the same polymer as the electrolyte filaments. The polymer electrolyte filaments in the matted layer may adhere to the coated surface of the separator. In addition the polymer coating is partially filling the pores of the porous electrolyte, but leaving sufficient space in the pores for the organic solution to penetrate the separator of the lithium battery.

30 Claims, 3 Drawing Sheets

FOREIGN PATENT DOCUMENTS

| | | |
|---|---|---|
| JP | 08138651 | 5/1996 |
| JP | 9-502566 | 3/1997 |
| JP | 11-003697 | 1/1999 |
| WO | WO 95/07551 | 3/1995 |

\* cited by examiner though initially without any lithium bearing compound, becomes lithiated after the final electrolyte is introduced into the assembled cell structure and the cell is activated.

PARTICULATE ELECTRODE INCLUDING ELECTROLYTE FOR A RECHARGEABLE LITHIUM BATTERY

This application is a continuation application of parent application Ser. No. 09/906,091 filed Jul. 17, 2001 now U.S. Pat. No. 6,815,121 which claimed the benefit of U.S. provisional application Ser. No. 60/221,955, filed Jul. 31, 2000.

FIELD OF INVENTION

This invention is related to electrochemical cells, more particularly, to rechargeable lithium ion electrochemical cells.

BACKGROUND OF THE INVENTION

Rechargeable lithium batteries are often utilized in applications where high energy density is a requirement. A lithium battery may contain one lithium electrochemical cell, but more commonly it consists of several lithium electrochemical cells in series or parallel, or a combination of such connections.

Lithium electrochemical cells are frequently packaged in cylindrical containers, or are button shaped, or laminar, sometimes referred to as thin profiled cells, packaged and sealed in multi-layered polymer laminates.

The electro-active particles of the negative electrode of a lithium electrochemical cell, are usually but not necessarily, graphite particles or carbonaceous particles of similar nature, which are capable of reversibly intercalating lithium ions. Other particulate substances which are capable of reversibly intercalating lithium, can also be utilized as negative-active particles. Lithium metal or lithium alloy, subject to certain conditions, may also be used as negative electrode material. The most commonly used electro-active particles in the positive electrode of lithium batteries are particles of lithiated transition metal oxides and sulphides, however, any other similar substance capable of reversibly intercalating lithium in its structure can be used. The electrolyte of a lithium cell is a non-aqueous liquid or a polymer containing mobile or dissociable lithium ions, or it can be a lithium salt containing glassy material, which is liquid at the temperature of operation of the lithium ion cell. The electrolyte of the cell is conductive for lithium ions but is an insulator with respect to electrons. The electrodes of a lithium electrochemical cell are usually separated from one another by some form of a separator. Negative and positive current collectors located adjacent the appropriate electrodes, provide electrical leads for charging and discharging the lithium ion electrochemical cell.

The electrolyte of a lithium electrochemical cell or battery, for obvious reasons, has an important role in the working of the cell, thus there are many known types of electrolytes utilized in lithium batteries. The electrolyte may be a non-aqueous, organic liquid having a lithium salt dissolved therein. The advantage of a liquid electrolyte is that the mobility of lithium ions is usually higher in a liquid than in a solid, however, the organic liquid may be lost by seepage if the container is punctured or damaged. The organic liquid is frequently an organic carbonate, or mixtures of such, but there are many other known organic compounds which have the required properties. Another frequently utilized form of electrolyte is a solid polymer layer bearing dissociable lithium compounds, such as for example, described in U.S. Pat. No. 5,436,091, issued to Shackle et al. on Jul. 25, 1995. It is noted that such polymer electrolyte layers frequently play the role of an electrode separator as well. In yet another form of electrolyte an inert porous polymer and a curable or polymerizable absorbent gelling compound are combined, and the combination is impregnated with an organic liquid containing a lithium salt, either before or after polymerization of the absorbent gelling compound. Such an electrolyte system is described, for example, in U.S. Pat. No. 5,681,357, issued to Eschbach et al. on Oct. 28, 1997.

It is also known to have an electrode paste comprising electro-active particles mixed with polymer electrolyte precursors and a lithium compound, which is subsequently fully polymerised to form an ionically conductive electrode layer. The electrode paste may additionally contain an ion conducting binder, such as for instance, a fluoropolymer. In the case of preparing a positive electrode or cathode layer containing cathode particles, in addition to polymerised electrolyte particles bearing a lithium compound and binders, fine carbon can also be added for electrical conduction. Fauteux et al. in U.S. Pat. No. 4,925,752, issued on May 15, 1990, teach a cathode paste made of a mixture of particles of vanadium oxide, polyethylene oxide, fine carbon, a lithium salt, propylene carbonate and a radiation curable acrylate. The cathode paste may be overlain with a curable, lithium salt containing electrolyte layer which also separates the cathode layer electrically from the negative electrode or anode, and the layers bearing polyethylene oxide and radiation curable acrylate are polymerized to form a tightly adherent layered cell assembly.

There are known rechargeable lithium cells in which the electrolyte particles are mixed with the electro-active particles and an ion conducting binder to form an electrode-electrolyte mixture which is then separated by means of a porous separator from the other electrode, such that electronic short circuiting between the electrodes is avoided but without hindering the passage of lithium ions between the electrodes.

Other known lithium ion electrochemical cell structures can be prepared by forming a negative electrode or anode slurry composed of carbonaceous electro-active particles, an ion conducting fluoropolymer dispersed in a low boiling point solvent and dibutyl phthalate as plasticizer, a positive electrode or cathode slurry composed of lithium ion bearing positive-active particles, an ion conducting fluoropolymer dispersed in a low boiling point solvent, dibutyl phthalate and electroconducting carbon particles, and an electrolyte slurry made of an ion conducting fluoropolymer dispersed in a low boiling point solvent and dibutyl phthalate, each cell component forming a separate entity. An example of this method is described in U.S. Pat. No. 5,756,230, issued to Feng Gao et al. on May 26, 1998, the obtained slurries are spread to form layers, the low boiling point solvent allowed to evaporate, the dibutyl phthalate is then extracted thereby leaving porous polymeric web structures which are subsequently assembled into lithium electrochemical cell precursors. Another example of such method is U.S. Pat. No. 5,571,634, issued to Gozdz et al. on Nov. 5, 1996, wherein the separator is comprising a PVDF copolymer and an organic plasticizer, each electrode is composed of appropriate electro-active particles dispersed in a PVDF copolymer matrix, and the each layer, namely, the negative electrode layer, the positive electrode layer and the electrolyte layer forms a flexible self-supporting cell element. It is noted that neither the ion conducting matrix carrying the electro-active particles, nor the separator element, contain any lithium bearing compound at the time of assembling the lithium cell precursor layers. Furthermore, the ion conducting matrix comprised in the electrodes is in the form of a laminate in which the ion conducting particles are randomly distributed, without any specific structural form, such as filaments.

It is noted that one of the conventional electrolyte systems utilized in rechargeable laminar lithium batteries is a combination of a solid, lithium ion conducting polymer electrolyte layer with an organic liquid solution having a dissolved lithium salt therein. The lithium compound in the solid polymer is usually but not necessarily, the same lithium compound that is dissolved in the organic solution.

It can be seen that in all the above discussed lithium electrochemical cells the role of the electrolyte is to allow dissociable lithium ions of various nature to be available for electrolytic movement and conduction in the proximity of the electro-active particles. Such objectives are frequently achieved by cell component layers being relatively tightly packed together. It is, however, known that the thickness of cathode and anode layers may change during cycling the cell through charging and discharging steps. Furthermore, the layers may also delaminate in small areas for different reasons. It is thus desirable to provide some indigenous elasticity between the electro-active and electrolyte particles and layers, and at the same time maintain good contact within and between the electrode layers.

SUMMARY OF THE INVENTION

A new electrode having a mixture of electrode-electrolyte particles, for rechargeable lithium batteries has been found, comprising electro-active particles intermixed with pliable, solid, ion conducting, polymer filaments containing a first dissociable lithium compound, said solid polymer electrolyte filaments having adhesive surfaces, thus forming a matted layer of interlinked filaments and adhering particles held together, and also having voids between the interlinked pliable filaments, which are subsequently impregnated with a non-aqueous solution containing a second dissociable lithium compound. The resulting mixture in the shape of a matted layer is placed between a current collector and an inert, porous separator having preferably, a multiplicity of polymer layers.

The rechargeable lithium electrochemical cell in one embodiment has a negative electrode comprising negative active particles intermixed with pliable, solid, ion conducting, polymer filaments containing a first dissociable lithium compound, said pliable, solid, polymer filaments having adhesive surfaces, said negative active particles adhering to the surface of the pliable, solid, ion conducting polymer filaments, which thereby form a matted layer of interlinked filaments and adhering negative active particles, having voids, and the matted layer is subsequently impregnated with a non-aqueous solution containing a second dissociable lithium compound. The matted layer comprising a first particulate mixture of interlinked, pliable, solid, ion conducting polymer filaments and adhering negative active particles, impregnated with a non-aqueous, lithium compound containing solution, is placed between the negative electrode current collector and one face of a multi-layered inert, porous polymer separator. A positive electrode having a matted layer comprising a second mixture of interlinked, pliable, solid, ion conducting, polymer filaments containing a first lithium compound and having adherent surfaces, and particles further comprising positive active particles and fine, electron conducting carbon, is placed between the other face of the multi-layered inert porous separator and a positive electrode current collector. The voids in the matted layer of the positive electrode are also impregnated with the second lithium compound containing non-aqueous solution In the rechargeable lithium battery of another embodiment of the invention, the multi-layered, inert, porous, polymer separator between the matted layers of the negative and positive electrodes, is coated on at least one of its faces with a porous layer of a solid polymer containing a first dissociable lithium compound, and the ion conducting polymer is partially filling the pores of said multi-layered, inert porous polymer separator. The ion conducting polymer coating the multi-layered, inert, porous separator, and partially filling the pores of the separator, has the same composition as the interlinked, pliable, ion conducting, solid polymer filaments having adhesive surfaces, comprised in the matted layers of the positive and negative electrodes of the rechargeable lithium electrochemical cell.

Figure 1:
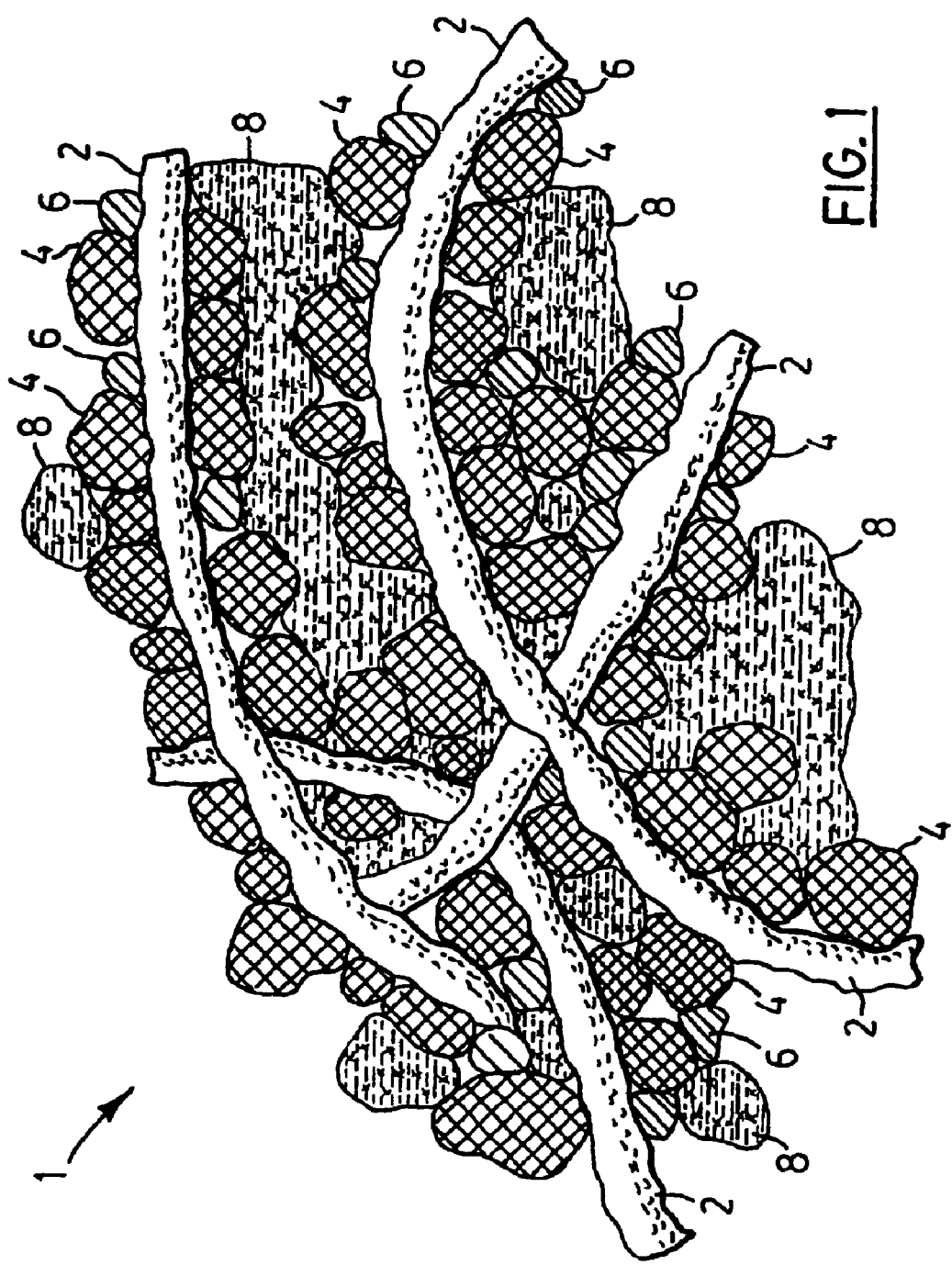
FIG. 1 is a schematic representation of a portion of an electrode mixture including electro-active particles in adherent contact with interlinked pliable, solid, ion conducting polymer filaments.

A detailed description of the preferred embodiments of the invention will be described hereinbelow and illustrated by working examples.

DETAILED DESCRIPTION OF THE PREFERRED EMBODIMENTS

As has been discussed above, good contact between the electro-active particles of a rechargeable lithium electrochemical cell and the lithium bearing electrolyte has a very strong influence on the power output and reliability of the lithium cell. One of the main features of the present invention is that it utilizes fibres or pliable filaments of a solid polymer electrolyte, thereby increasing the surface area of the solid polymer electrolyte. The pliable, polymer filaments or fibres bear a lithium compound capable of dissociating, thereby providing mobile lithium ions. In other words the pliable, solid polymer filaments are ion conducting. In addition, the ion conducting, polymer filaments have adhesive and somewhat uneven surfaces. The polymer filaments having adhesive or tacky and uneven surfaces are intermixed with electro-active particles, which adhere to the tacky and uneven surfaces of the polymer filaments. The polymer ion conducting filaments can also adhere to one another, thereby the mixture of interlinked filaments to which electro-active particles are adhering, has a paste-like consistency which can be spread to form a porous matted layer or a matted body. The pores of the particulate matted layer are subsequently filled or impregnated with a non-aqueous, organic electrolyte solution, which also contains a lithium compound. The matted layer by virtue of the interlinked, ion conducting polymer filaments, have a degree of elasticity or springiness, which is desirable in electrode layers located between current collectors and porous, polymer separators of laminar rechargeable lithium batteries packaged and sealed in laminated polymer wrapping.

For the sake of clarity the following definitions of the phrases and expressions used in the disclosure are provided:

Pliable filaments—is understood to mean that the polymer filaments utilized in the present invention have aspect ratios greater than 5, and can be bent and folded without breaking.

Adhesive surface of filaments—is understood to mean that the surface is somewhat tacky without the application of any additional adhesive substance, or treatment of the surface, resulting in the admixed particles readily adhering to such filament surface without rigidly bonding or being chemically attached to it. In addition, the pliable polymer filaments are also capable of adhering to one another thereby forming an interlinking structure.

Matted layers or compacted matted structures as referred to in the present disclosure, are coherent mixtures of pliable polymer filaments and electro-active and other electrode component particles yielding a loose, flexible, resilient structure which is also able to retain and hold the liquid electrolyte solution in its voids. The matted structure is formed by the interlinking of the adhesive and tacky surfaces of the pliable polymer filaments with one another and with the admixed electrode component particles.

Mobile lithium ion—is understood to mean that the lithium ions in the lithium compounds utilized in the present invention are capable of dissociation, and being mobilized or moved when subjected to electrical or thermodynamic potential gradients.

Partial filling of pores—is understood to mean that a relatively thin coating along the walls of the pores is obtained by known methods, which leaves sufficient space for another liquid to fill and penetrate the remaining space within the pores.

It is known that mobility of ions is usually higher in a liquid than in a solid. On the other hand, the amount of non-aqueous dissociable lithium compound containing solution a laminar lithium cell or battery is able to hold per unit volume is limited. Excess amount of liquid present in the packaged and sealed lithium electrochemical cell may lead to the cell exceeding the desired dimensions, and/or the packaging can be punctured or be otherwise damaged, resulting in loss of some or all of the organic solution, and thus substantially reducing the population of the ionic carriers in the cell. Utilizing a solid, lithium compound bearing polymer can be advantageous because the polymer can be an adhering layer between the electrodes, as well as formed as pliable, ion conducting polymer filaments. It is believed, but this explanation by no means is considered binding, that the dissociable lithium compounds are located between the grain boundaries or between the molecular domains of the solid polymer, and the lithium ions move along the grain boundaries of the solid polymer electrolyte in the charging or discharging process of the cell. In the preferred embodiments of the present invention lithium compound bearing polymer filaments and coatings, as well as lithium compound containing organic solutions are utilized simultaneously. The solubility of lithium compounds may be different in the non-aqueous liquid utilized in the lithium electrochemical cell from that in the solid polymer. Hence it may be of advantage to utilize one dissociable lithium compound dissolved in the non-aqueous, or organic solution and another lithium compound in the solid polymer electrolyte. In other words, the dissociable lithium compound in the solid polymer electrolyte may be different from the lithium compound dissolved in the non-aqueous electrolyte solution, but may also be the same, dictated by convenience or cell design only.

The solid electrolyte filaments can be made of known oxides of polyolefins, or polyvinylidene fluoride copolymers or their combinations, or by chemical equivalents. The polymer to be used for obtaining polymer filaments having a tacky surface, has melting temperatures higher than 180° C., as well as being capable of retaining dissociable lithium compounds in its polymer structure. A solution or suspension is obtained of the selected polymer in a low boiling point solvent, such as acetone, or methyl-pyrrolidene (NMP) or in solvents of similar characteristics, to which a dissociable lithium compound, referred to hereinbelow as the first lithium compound, may also be added in a concentration, which would be considered appropriate for ionic conduction by a person skilled in the art. The pliable, polymer filaments can be obtained by conventional methods, such as spinning, precipitation, extruding through an appropriately sized sieve or similar known methods. The pliable, polymer filaments may also be obtained by spinning in a molten state. The preferred aspect ratio of the filaments ranges between 1:5 and 1:100, however, the convenient filament size is between 5–30 µm long and has diameters less than 1 µm. The tacky or adhesive surface of the filaments is in part due to the nature of the polymer composition selected for obtaining pliable polymer filaments, and in part to some solvent retention, as well as to the somewhat rough and uneven surface of the filaments produced by the above methods. The selected lithium compound may be introduced into the polymer structure of the filaments either during the production of the filaments, or in a subsequent process step by soaking the filaments in lithium compound containing organic solution for a brief period of time. It is noted that no invention is claimed for either the composition of the polymer filaments, or for the method of obtaining the polymer filaments.

The particle size of the electro-active particles utilized in the lithium electrochemical cells is usually less than 25 µm, and preferably ranges between 5 and 15 µm. It is preferred to admix fine carbon for electronic conduction in a few weight percent, usually in an amount less than 7 wt. %, except when the electro-active particle utilized is a carbonaceous substance, such as for example, graphite particles. Fine carbon is a general terminology for carbon black, Shawinigan black, acetylene black and similar fine carbonaceous particles frequently used as an electronically conducting additive. For best results the mixed electro-active and other particles are wetted with a few weight percent of a low boiling point solvent and mixed with the lithium compound containing, ion conducting, pliable polymer filaments. The convenient weight ratio of filaments to the electro-active particles in the particulate electrode mixture will depend on the density of the solid polymer the filaments are made of, their average diameter and length, the bulk density of the electro-active particles and other electrode components, but it is conveniently less than 15:85. The polymer filament—electro-active particle bearing mixture can be obtained by hand mixing or by utilizing a relatively gentle mechanical mixing device. The mixture is subsequently formed or spread into a layer, which is conveniently carried by the current collector film, mesh or sheet. The spreading of the particulate mixture is usually conducted by some light force yielding a matted layer, in which the tacky and somewhat uneven surface of the fibres or filaments adhesively interlink, and hold the electro-active particles, and optionally added the fine carbon particles, adhesively together The matted layer will retain some springiness, or flexibility and elasticity, as well as some voids, which are filled subsequently with an organic, non-aqueous solution containing a second lithium compound. As discussed above, the first and second lithium compounds may be different or may be the same, dictated by convenience only. FIG. 1 is a schematic representation of a portion shown by reference numeral 1, of an electrode mixture in accordance with the present invention. The mixture is shown to contain pliable, ion conducting, solid polymer filaments having a tacky and uneven surface, indicated by reference numeral 2, electro-active particles 4, fine carbon particles 6, and voids which are filled by a non-aqueous, organic, lithium compound containing electrolyte solution 8.

The organic solvent in the non-aqueous solution may be a known organic carbonate or a mixture of organic carbonates, or chemical equivalents. The lithium compound concentration in the organic solution is about 1 Molar, but generally is determined by convenience. The non-aqueous solution in each one of the particulate electrode mixtures within the same electrochemical cell has usually the same composition but may be different under some circumstances, dictated by convenience only.

Most lithium compounds commonly available for use in lithium electrochemical cells can be used in the present invention, either in the solid polymer electrolyte and/or in the non-aqueous solution, such as for example, lithium perchlorate ($LiClO_4$), lithium triflate ($LiCF_3SO_3$) or lithium compounds having the following anions: borofluoride ($LiBF_4$), phosphofluoride ($LiPF_6$), arsenofluoride ($LiAsF_6$), antimony-fluoride ($LiSbF_6$), and similar suitable, known anionic radicals.

The lithium electrochemical cell of one embodiment of the present invention is made up with one or both of its electrodes comprising an electro-active component intermixed and held adhesively together with pliable, solid, ion conducting polymer electrolyte filaments having tacky and somewhat uneven surfaces, and containing a dissociable lithium compound. The pliable polymer filaments are also adhering to one another, thereby forming an interlinking structure. The particulate mixture in a subsequent step is impregnated with a non-aqueous solution containing another or the same dissociable lithium compound. The electrodes comprising a particulate mixture in accordance with the present invention, are usually separated by an inert porous separator which is preferably multi-layered. The external or opposite face of each of the matted particulate mixture bearing electrodes is placed in contact with a conventional current collector. The negative active component in the particulate negative electrode can be a carbonaceous substance, such as graphite, meso-phase carbon particles, and materials of similar nature, which are capable of reversibly intercalating lithium ions. The positive active material in the particulate positive electrode is frequently a lithiated transition metal oxide or a solid solution of such oxides, such as for example, lithiated nickel oxide, lithiated cobalt oxide, lithiated manganese oxide, or a lithiated transition metal sulphide, but any conventional substance which is capable of reversibly intercalating lithium ions at an electrochemical potential different from the negative active component can be used.

The role of the inert, porous separator which is usually impregnated with a liquid electrolyte, is to allow the passage of lithium ions from one electrode to the other in the charging and discharging of the cell or the battery. The separator additionally functions as a means to encase one face of the particulate electrode-electrolyte mixture, as well as to prevent electronic contact between the negative and positive electrodes and current collectors. As described above, in the preferred embodiment the mixture of the electro-active particles with the electrolytes, held adhesively together by the tacky surface of the polymer electrolyte filaments, ultimately also containing a lithium ion bearing non-aqueous solution, forms a layer between the current collector and the separator. It is also desirable that the separator lends some support and shape retention to the electro-active particle-electrolyte particulate mixture, as well as providing some other cell protective measures, hence the separator layer is preferably made of several porous polymer layers. It is further preferred that the multi-layered inert, separator is a combination of porous or microporous polypropylene and porous or microporous polyethylene polymer layers. The number of layers and their combined thickness within the inert, porous separator are dictated by economic considerations and convenience only.

Figure 2A:
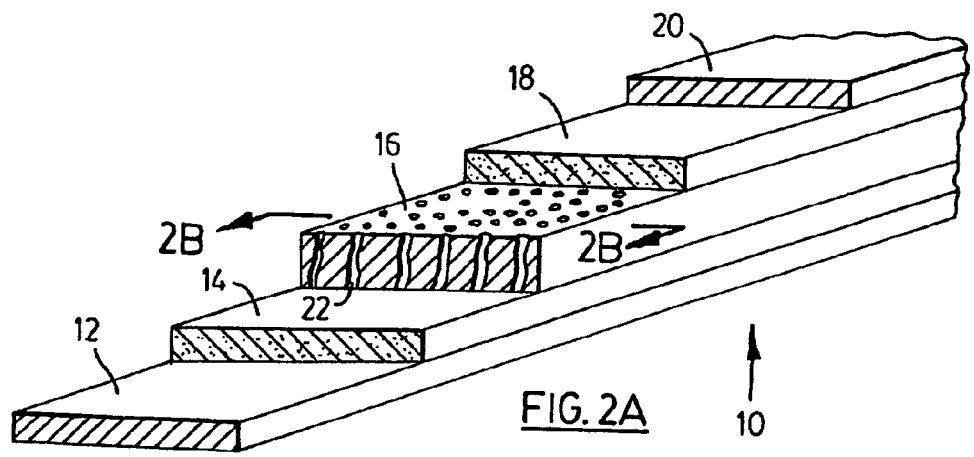
FIG. 2A is a diagrammatic representation of electrode layers, a porous separator layer and current collectors according to one embodiment of the present invention.
Figure 2B:
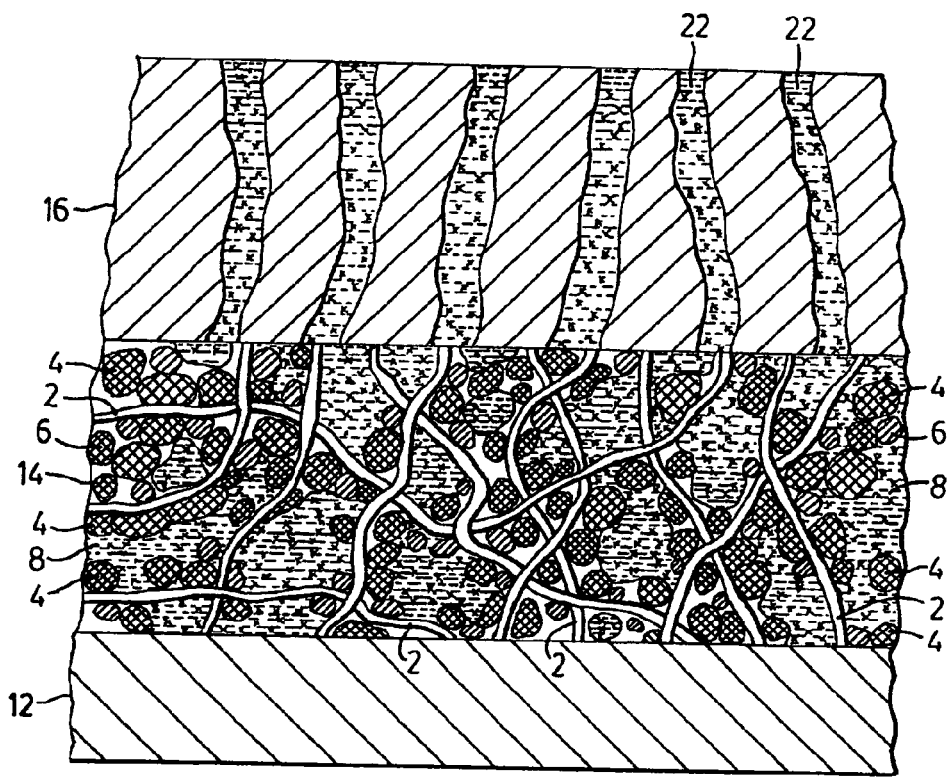
FIG. 2B is a schematic sectional drawing of FIG. 2A in the plane indicated by arrows.

As discussed above, in laminar rechargeable lithium batteries of the present invention the matted layer of a negative electrode is separated from the positive electrode by an inert, porous or microporous polymer layer, which is preferably a multi-layered separator. The second lithium compound containing non-aqueous liquid electrolyte solution may be painted between the matted, particulate first lithium compound bearing layer and the separator, or the layers are first assembled and then impregnated with the non-aqueous, lithium compound containing solution. The assembled polymer layers may be inserted between appropriate current collectors in a known manner. FIG. 2A gives a diagrammatic representation of a laminar lithium cell 10, where the current collectors are shown by reference numerals 12 and 20, the electrodes are shown as 14 and 18 respectively, and the inert porous separator having pores 22, is shown by reference numeral 16. A schematic cross-section of FIG. 2A in the plane indicated by the arrows is shown on FIG. 2B, having the pores 22 of the porous separator filled with the liquid electrolyte. Like elements are represented by like reference numerals.

In another arrangement of conventional lithium electrochemical cell assembly a centrally located current collector is in contact with a particulate electrode comprising a mixture of electro-active particles and pliable, solid, ion conducting, adhesively interlinking polymer filaments having adhesive surfaces, and forming a matted layer, enclosing the current collector. An inert, porous preferably multi-layered, polymer separator is then placed to be in contact with each external face of the electrode, the other face of the polymer separator is in turn brought in contact with the other electrode and the other current collector. The other electrode is preferably a particulate electrode, comprising a matted layer of a mixture of pliable, solid, ion conducting, interlinking polymer filaments and adhesively held electro-active particles. Other known assembly of the elements of a rechargeable lithium battery is also acceptable. The assembled lithium electrochemical cell or battery is packaged and sealed in a multi-layered polymer container which is capable of excluding moisture and is oxidation resistant, in the usual manner.

Figure 3A:
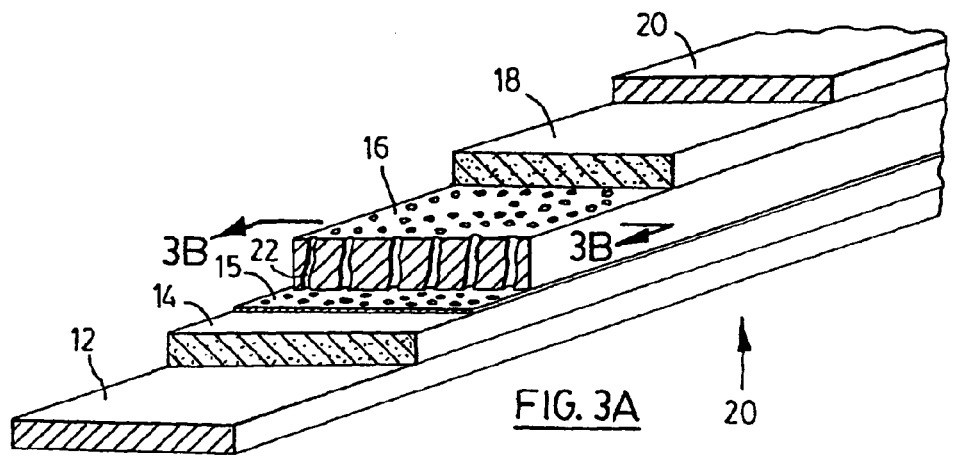
FIG. 3A is a diagrammatic representation of the current collectors, electrode layers and a porous separator layer coated on one of its faces, according to another embodiment of the present invention.
Figure 3B:
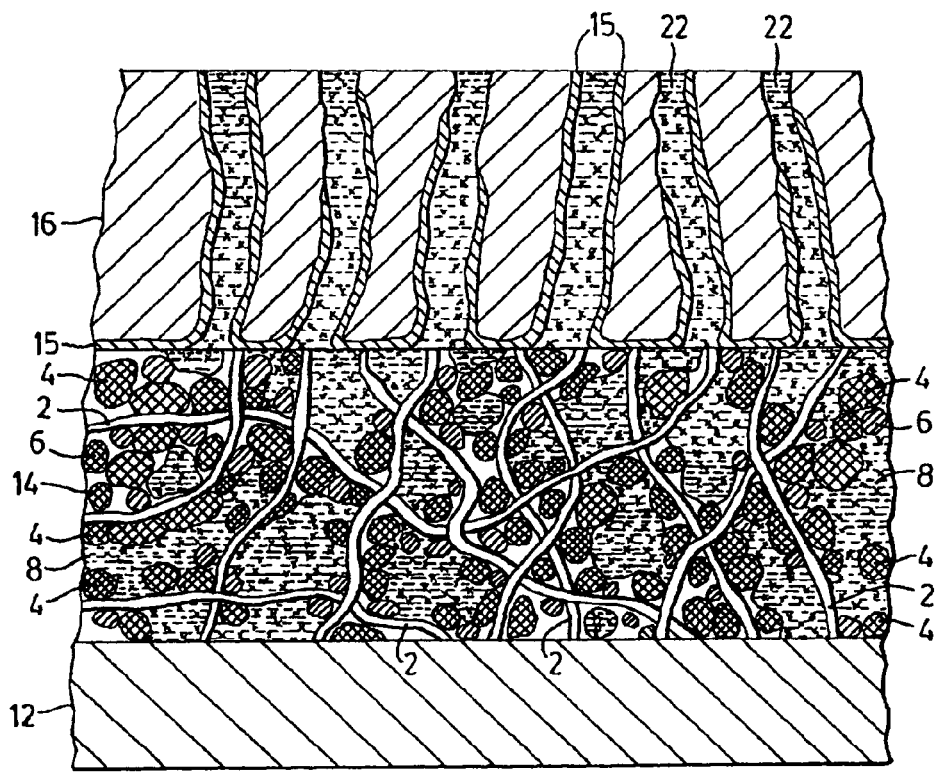
FIG. 3B is a schematic sectional drawing of FIG. 3A in the plane indicated by arrows.

In another embodiment of the present invention a thin, porous, adhesive layer, comprising the same lithium compound containing polymer as the pliable, solid, ion conducting polymer filaments, is deposited on at least one face of the multi-layered separator. The adhesive, porous lithium ion containing, polymer coating on the face of the inert, porous, polymer separator renders an adhesive contact between the solid polymer electrolyte filaments in the particulate mixture and the separator. The porous, ion conducting, polymer coating can be obtained by dipping an inert porous, polymer separator, or a separator made of several porous polymer layers in a weak solution in a low boiling solvent, containing the lithium compound bearing polymer, and on removal from the solution allowing the solvent to evaporate. The ion conducting polymer residue of the weak solution leaves a tacky layer of only a few micron thickness on both faces of the inert, porous polymer separator and simultaneously, the residue provides a thin coating on the walls of the pores of the separator, thereby partially filling the pores of the separator. In another method the lithium compound containing solution is painted on at least one of the faces of the inert, porous, preferably multi-layered, polymer separator. But other conventional methods to obtain a thin, ion conducting polymer coating may also be used. As mentioned above, the lithium compound bearing, thin, solid polymer layer obtained is also providing a coating along the walls of the pores of the inert, porous polymer separator, partially filling the pores, but leaving sufficient opening for the introduction of the organic lithium compound containing liquid electrolyte. It is noted that the degree of penetration of the polymer coating into the pores of the separator is difficult to assess, it may however, be stated that by the above described treatment the thin, ion conducting, solid polymer coating, having an adhesive surface is anchored to the inert, porous separator layer. It is believed that the passage of lithium ions from one electrode to the other may take place by means of the solid, ion conducting polymer filaments and the solid, ion conducting polymer coating carried by the porous separator, as well as by the lithium compound containing solution held in the voids of the matted particulate electrode layer and in the partially filled pores of the separator. Alternatively, the lithium ions may also cross from liquid to solid and vice versa. Diagrammatic representation of the second embodiment of the present invention is shown on FIG. 3A where the adhesive lithium compound containing, solid polymer coating of the inert, porous polymer separator is indicated by reference numeral 15. The partial filling of pores 22, by means of forming a lithium ion conducting, solid polymer coating 15, along the walls of the pores of the separator is also shown both on FIG. 3A and on FIG. 3B, the latter being a schematic drawing of the cross-section of FIG. 3A, in the plane of the arrows. The filling of the remaining unfilled portion of the pores 22, by lithium containing, non-aqueous liquid electrolyte 8, is also indicated on both FIG. 3A and FIG. 3B.

The current collectors of the lithium cell or battery are metal foil or grid or mesh, usually but not necessarily made of copper, aluminum or nickel, or alloys of such metals.

It is advisable that the lithium electrochemical cell bearing electro-active particle-electrolyte particulate mixtures, as well as the complete lithium battery made of such cells, is manufactured in a moisture free atmosphere, and the cells are subsequently sealed and packaged in the conventional manner.

EXAMPLE 1

Polymer electrolyte filaments were obtained by conventional filament spinning methods utilizing a solution of polyvinylidene fluoride and polyethylene oxide in acetone, also containing lithium phosphofluoride ($LiPF_6$) in 10 wt. % based on the solid content. The polymer filaments obtained were pliable, had a somewhat tacky surface at room temperature and had average length of 12 µm, and 0.8 µm diameter. The filaments were first wetted by about 2 wt. % of acetone and were mixed with meso-phase graphite particles (MCMB) having average particle size of 10 µm, manufactured by Osaka Gas Co., in a weight ratio of polymer filaments to graphite=6:94. The mixture was obtained by hand mixing and subsequently spread in 200 µm layer thickness by doctor's blade method on a 10 µm thick copper foil. The negative electrode layer so obtained was saturated with an organic electrolyte solution made of ethylene carbonate-dimethyl carbonate, containing $LiPF_6$ in 1 M concentration. Subsequently, the face of the negative electrode was overlain by a microporous polymer separator composed of two layers of polypropylene and two layers of polyethylene, marketed by CELGARD. The positive electrode was prepared using polymer filaments having the same composition as those in the negative electrode, mixed with particles of lithium-cobalt oxide ($LiCoO_2$) having average particle size of 12 µm, and fine carbon (Shawinigan Black). The positive electrode mix had composition as follows: lithium-metal oxide:polymer filament:carbon=89:7:4 in wt. %. The mixture was spread by doctors blade method in 200 µm thickness over 12 µm thick aluminum foil current collector, and the upper, free face was impregnated with the $LiPF_6$ containing non-aqueous electrolyte, as the negative electrode above. The solid components of the assembled rechargeable lithium battery were found to amount to 62 wt. % and the organic liquid provided the balance of 38 wt. %. The obtained rechargeable lithium electrochemical cell assembly composed of 3 layers, enclosed between copper and aluminum current collectors, was wrapped in multiple layered conventional aluminum coated polyethylene packaging material, and sealed in the usual manner.

EXAMPLE 2

Polymer filaments were obtained from a suspension of VdF:HFP copolymer marketed as KYNAR FLEX 2750, in (NMP), also containing 7 wt. % Lithium perchlorate ($LiClO_4$) based on solid content of the solution, by conventional extrusion. The solid, lithium compound bearing polymer filaments having a tacky surface were mixed with MCMB graphite particles as in Example 1, to form the negative electrode of a rechargeable lithium electrochemical cell. A multi-layer porous separator was painted with 2 wt. % solution of VdF:HFP copolymer in NMP also containing $LiClO_4$ on one of its faces and the solvent allowed to evaporate. The separator was placed on the negative electrode layer with the coated face being in contact with the polymer filament bearing electrode layer. The positive electrode was prepared utilizing the same lithium compound containing, solid polymer electrolyte filaments as in the negative electrode, mixed with lithium-manganese oxide ($LiMnO_2$) and fine carbon, in a ratio of $LiMnO_2$:polymer electrolyte filaments:carbon=88:8:4, and carried by an aluminum foil current collector. The prepared positive electrode was brought in contact with the uncoated face of the multi-layered polymer separator. An organic electrolyte solution containing $LiAsF_6$ in 1 M concentration in ethylene carbonate-methyl ethylene carbonate mixture was prepared, the electrode-separator-electrode assembly impregnated with the liquid electrolyte. The solid to liquid weight ratio within the obtained 3-layered structure enclosed between current collectors was found to be 61.5:38.5. The lithium cell structure was packaged in aluminum-backed polymer multi-layered laminates and sealed in the usual manner to provide a rechargeable, laminar electrochemical cell.

EXAMPLE 3

The electrodes of another rechargeable lithium battery were prepared from electro-active particles and solid, lithium ion conducting polymer filaments as described in Example 2, however, the multi-layered inert, polymer separator in this lithium ion cell was dipped in 2 wt. % VdP:HFP copolymer solution in NMP also containing lithium perchlorate, thus providing a polymer separator coated with an ion conducting, solid, polymer layer having adhesive surface, on each face to be in contact with the negative and positive electrode, respectively. The assembled electrodes and the separator coated with solid polymer electrolyte on both faces was subsequently placed between the current collectors, and was impregnated with lithium arsenofluoride containing organic electrolyte as in Example 2. The solid content of the obtained lithium cell structure was 62.4 wt. % the balance being non-aqueous liquid electrolyte. Finally, the lithium electrochemical cell obtained was packaged and sealed in similar manner as in Examples 1 and 2.

EXAMPLE 4

The performance of lithium batteries prepared and assembled in accordance with the present invention was compared with conventional batteries having layered negative and positive electrodes, a multi-layered polymer separator inserted between the electrodes, and the three layered structure subsequently being impregnated with a lithium compound containing organic solution, then assembled and sealed in the usual manner.

Lithium batteries were manufactured as described in Example 3, and their impedance and discharge capacity measured. The impedance and discharge capacity of conventionally prepared lithium batteries were also measured and the obtained measurements are tabulated in Table 1 below.

TABLE 1

| Test No. | Conventional Li battery | | Lithium battery of present invention | |
|---|---|---|---|---|
| | Impedance mohm | Disch. Capacity Amp. h | Impedance mohm | Disch. Capacity Amp. h |
| 1 | 34.7 | 10.50 | 32.5 | 11.01 |
| 2 | 33.14 | 10.75 | 32.2 | 11.19 |
| 3 | 34.01 | 10.60 | 32.7 | 11.06 |
| 4 | 32.3 | 10.88 | 31.8 | 11.29 |
| 5 | 32.5 | 10.90 | 31.6 | 11.39 |
| Mean | 33.38 | 10.73 | 32.16 | 11.19 |

It can be seen that the internal resistance or impedance of the lithium battery made in accordance of the present invention has dropped on average by 3.65% when compared to the internal resistance or impedance of a lithium battery having a similar structure but having no polymer electrolyte filaments with adhesive surfaces in the electrodes and having no porous polymer coating on the inert, porous polymer separator layers. The discharge capacity measured on lithium batteries made in accordance with the present invention was found to have increased on average by 4.13% when compared to the discharge capacity of conventional batteries.

The electrode or electrodes of the rechargeable lithium batteries described above are made of pliable, solid, ion conducting polymer filaments which have adhesive surfaces and electro-active particles adhering to the surfaces. The filaments and the adhering particles form a matted layer having voids which are filled with non-aqueous, lithium ion compound containing liquid electrolytes. One of the particulate advantages of the electrode mixture of the present invention is that lithium ionic movement in the electro-active particles can be both via the solid electrolyte filaments and the liquid electrolyte, thereby enhancing the overall conductivity within the electrodes. Furthermore, the inert, porous, preferably multi-layered, polymer separator is coated either one or both faces with a solid, ion conductive polymer layer which in addition partially fills the pores, while allowing the unfilled portion of the pores to contain a lithium ion bearing liquid electrolyte, thereby further facilitating ionic movement and reducing impedance of the cell.

Another advantage of the rechargeable lithium batteries made as described above is that the springiness and elasticity of the matted electrode layers comprising pliable solid polymer electrolyte filaments with adhesive surfaces intermixed with electro-active particles can maintain good contact between the particles within the electrodes, and between the electrodes and the separator layers, in the process of repeated charging and discharging the electrochemical cells and batteries. Hence no stacking pressure needs to be applied when utilizing rechargeable lithium batteries manufactured in accordance with the different embodiments of the present invention.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. A method of assembling a particulate electrode for a rechargeable lithium battery, comprising the steps of:
    i) providing pliable, solid, ion conducting, polymer filaments having adhesive surfaces, containing a first dissociable lithium compound, having aspect ratio ranging between 1:5 and 1:100 and having lengths between 5 and 30 μm and cross-sectional diameter less than 1 μm;
    ii) providing electro-active particles and mixing said electro-active particles with said pliable, solid, ion conducting, polymer filaments containing said first dissociable lithium compound and having adhesive surfaces, thereby obtaining a matted layer of electro-active particles adhering to said pliable, solid, ion conducting, polymer filaments, said matted layer having voids; and
    iii) impregnating said matted layer by means of filling said voids with a non-aqueous, organic solution containing a second dissociable lithium compound.

2. A method of assembling a particulate electrode for a rechargeable lithium battery, as claimed in claim 1, wherein electron conducting fine carbon particles are additionally admixed with said electro-active particles.

3. A method of assembling a particulate electrode for a rechargeable lithium battery, as claimed in claim 1, wherein said pliable, solid, ion conducting, polymer filaments containing said first dissociable lithium compound, and having adhesive surfaces, are made of at least one of the polymers selected from the group consisting of an oxide of polyolefin polymers and polyvinylidene fluoride copolymers.

4. A method of assembling a particulate electrode for a rechargeable lithium battery, as claimed in claim 1, wherein said first dissociable lithium compound contained in said pliable, solid, ion conducting, polymer filaments, is selected from the group consisting of lithium perchlorate ($LiClO_4$), lithium borofluoride ($LiBF_4$), lithium phosphofluoride ($LiPF_6$), lithium arsenofluoride, ($LiAsF_6$), lithium antimony-fluoride ($LiSbF_6$) and lithium triflate ($LiCF_3SO_3$).

5. A method of assembling a particulate electrode for a rechargeable lithium battery, as claimed in claim 1, wherein said second dissociable lithium compound contained in said non-aqueous, organic solution, is selected from the group consisting of lithium perchlorate ($LiClO_4$), lithium borofluoride ($LiBF_4$), lithium phosphofluoride ($LiPF_6$), lithium arsenofluoride, ($LiAsF_6$), lithium antimony-fluoride ($LiSbF_6$) and lithium triflate ($LiCF_3SO_3$).

6. A method of assembling a particulate electrode for a rechargeable lithium battery, as claimed in claim 1, wherein said first dissociable lithium compound and said second dissociable lithium compound are the same.

7. A method of assembling a particulate electrode for a rechargeable lithium battery, as claimed in claim 1, wherein said first dissociable lithium compound and said second dissociable lithium compound are different.

8. A method of assembling a particulate electrode for a rechargeable lithium battery, as claimed in claim 1, wherein said electro-active particles mixed with said pliable, solid, ion conducting, polymer filaments and providing said matted layer, are negative-active particles capable of reversibly intercalating lithium ions.

9. A method of assembling a particulate electrode for a rechargeable lithium battery, as claimed in claim 8, wherein said negative-active particles are carbonaceous particles capable of reversibly intercalating lithium.

10. A method of assembling a particulate electrode for a rechargeable lithium battery, as claimed in claim 1, wherein said electro-active particles mixed with said pliable, solid, ion conducting, polymer filaments and providing said matted layer, are positive-active particles capable of reversibly intercalating lithium ions.

11. A method of assembling a particulate electrode for a rechargeable lithium battery, as claimed in claim 10, wherein said positive-active particles are selected from the group consisting of: particles of lithiated transition metal oxides, particles of lithiated solid solution of transition metal oxides, and particles of lithiated transition metal sulphides.

12. A method of assembling a particulate electrode for a rechargeable lithium battery, as claimed in claim 1, wherein said non-aqueous, organic solution containing a second dissociable lithium compound comprises an organic carbonate or a liquid mixture of organic carbonates.

13. A method of assembling a particulate electrode for a rechargeable lithium battery, comprising the steps of:
  i) providing pliable, solid, ion conducting, polymer filaments having adhesive surfaces, containing a first dissociable lithium compound, and having aspect ratio ranging between 1:5 and 1:100;
  ii) providing electro-active particles and mixing said electro-active particles with said pliable, solid, ion conducting, polymer filaments containing said first dissociable lithium compound, and having adhesive surfaces, thereby obtaining a matted first layer of electro-active particles adhering to said pliable, solid, ion conducting, polymer filaments, said matted first layer having voids;
  iii) providing a second layer of pliable, solid, ion conducting polymer capable of adhesive attachment to said matted first layer, said second pliable, solid, ion conducting polymer layer containing said first dissociable lithium compound comprised in said pliable, solid, ion conducting, polymer filaments included in said matted first layer; and
  iv) impregnating said matted first layer by means of filling said voids with a non-aqueous, organic solution containing a second dissociable lithium compound.

14. A method of assembling a particulate electrode for a rechargeable lithium battery, as claimed in claim 13, wherein electron conducting fine carbon particles are additionally admixed with said electro-active particles.

15. A method of assembling a particulate electrode for a rechargeable lithium battery, as claimed in claim 13, wherein said pliable, solid, ion conducting, polymer filaments included in said matted first layer and having aspect ratio ranging between 1:5 and 1:100, have lengths ranging between 5 and 30 μm and cross-sectional diameter less than 1 μm.

16. A method of assembling a particulate electrode for a rechargeable lithium battery, as claimed in claim 13, wherein said pliable, solid, ion conducting, polymer filaments included in said matted first layer, containing said first dissociable lithium compound, and having adhesive surfaces, are made of at least one of the polymers selected from the group consisting of an oxide of polyolefin polymers and polyvinylidene fluoride copolymers.

17. A method of assembling a particulate electrode for a rechargeable lithium battery, as claimed in claim 13, wherein said first dissociable lithium compound contained in said pliable, solid, ion conducting, polymer filaments included in said matted first layer and in said second layer of pliable, solid, ion conducting polymer, is selected from the group consisting of lithium perchlorate ($LiClO_4$), lithium borofluoride ($LiBF_4$), lithium phosphofluoride ($LiPF_6$), lithium arsenofluoride, ($LiAsF_6$), lithium antimony-fluoride ($LiSbF_6$) and lithium triflate ($LiCF_3SO_3$).

18. A method of assembling a particulate electrode for a rechargeable lithium battery, as claimed in claim 13, wherein said second dissociable lithium compound contained in said non-aqueous, organic solution, is selected from the group consisting of lithium perchlorate ($LiClO_4$), lithium borofluoride ($LiBF_4$), lithium phosphofluoride ($LiPF_6$), lithium arsenofluoride, ($LiAsF_6$), lithium antimony-fluoride ($LiSbF_6$) and lithium triflate ($LiCF_3SO_3$).

19. A method of assembling a particulate electrode for a rechargeable lithium battery, as claimed in claim 13, wherein said first dissociable lithium compound and said second dissociable lithium compound are the same.

20. A method of assembling a particulate electrode for a rechargeable lithium battery, as claimed in claim 13, wherein said first dissociable lithium compound and said second dissociable lithium compound are different.

21. A method of assembling a particulate electrode for a rechargeable lithium battery, as claimed in claim 13, wherein said electro-active particles mixed with said pliable, solid, ion conducting, polymer filaments and providing said matted first layer, are negative-active particles capable of reversibly intercalating lithium ions.

22. A method of assembling a particulate electrode for a rechargeable lithium battery, as claimed in claim 21, wherein said negative-active particles are carbonaceous particles capable of reversibly intercalating lithium.

23. A method of assembling a particulate electrode for a rechargeable lithium battery, as claimed in claim 13, wherein said electro-active particles mixed with said pliable, solid, ion conducting, polymer filaments and providing said matted layer, are positive-active particles capable of reversibly intercalating lithium ions.

24. A method of assembling a particulate electrode for a rechargeable lithium battery, as claimed in claim 23, wherein said positive-active particles are selected from the group consisting of: particles of lithiated transition metal oxides, particles of lithiated solid solution of transition metal oxides, and particles of lithiated transition metal sulphides.

25. A method of assembling a particulate electrode for a rechargeable lithium battery, as claimed in claim 13, wherein said non-aqueous, organic solution containing a second dissociable lithium compound comprises an organic carbonate or a liquid mixture of organic carbonates.

26. A method of assembling a particulate electrode for a rechargeable lithium battery, as claimed in claim 13, wherein said second pliable, solid, ion conducting polymer layer containing said first dissociable lithium compound and adhesively connected to said matted first layer, forms a coating on an inert, porous face.

27. A method of assembling a rechargeable lithium battery, said rechargeable lithium battery having at least two current collectors, at least two electrodes of opposing polarity, at least one of the electrodes of opposing polarity being a particulate electrode, and an inert, porous separator having opposing faces, comprising the steps of:
  i) providing pliable, solid, ion conducting, polymer filaments having adhesive surfaces, containing a first dissociable lithium compound, and having aspect ratio ranging between 1:5 and 1:100;
  ii) providing electro-active particles and mixing said electro-active particles with said pliable, solid, ion conducting, polymer filaments containing said first dissociable lithium compound and having adhesive surfaces, thereby obtaining a matted layer of electro-active particles adhering to said pliable, solid, ion conducting, polymer filaments, said matted layer having voids;
  iii) inserting the matted layer so obtained between said one of said current collectors and one of said opposing faces of said inert, porous separator;
  iv) bringing the second of said electrodes of opposing polarity into contact with said second of said opposing faces of said inert, porous separator and attaching said second current collector to said second of said electrodes of opposing polarity; and,
  v) subsequently, impregnating said matted layer included in the particulate electrode by means of filling said voids, and said inert porous separator having a pair of opposing faces, with a non-aqueous, organic solution containing a second dissociable lithium compound.

28. A method of assembling a rechargeable lithium battery, said rechargeable lithium battery having at least two current collectors, at least two electrodes of opposing polarity, at least one of the electrodes of opposing polarity being a particulate electrode, and an inert, porous separator having opposing faces, as claimed in claim 27, wherein at least one of the opposing faces of said inert, porous separator is coated with a layer of pliable, solid, ion conducting, polymer, comprised in said pliable, solid, ion conducting, polymer filaments having adhesive surfaces.

29. A method of assembling a rechargeable lithium battery, said rechargeable lithium battery having at least two current collectors, at least two electrodes of opposing polarity, at least one of the electrodes of opposing polarity being a particulate electrode, and an inert, porous separator having opposing faces, as claimed in claim 28, wherein the other of said electrodes of opposing polarity is also a particulate electrode.

30. A method of assembling a rechargeable lithium battery, said rechargeable lithium battery having at least two current collectors, at least two electrodes of opposing polarity, at least one of the electrodes of opposing polarity being a particulate electrode, and an inert, porous separator having opposing faces, as claimed in claim 27, wherein the other of said electrodes of opposing polarity is also a particulate electrode.

* * * * *